United States Patent
Yang et al.

(10) Patent No.: US 6,232,256 B1
(45) Date of Patent: May 15, 2001

(54) CATALYST COMPOSITION FOR THE POLYMERIZATION OF OLEFINS

(75) Inventors: Xinmin Yang, Somerset; Walter Thomas Reichle, Warren; Frederick John Karol, Belle Mead, all of NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/434,449

(22) Filed: Nov. 5, 1999

Related U.S. Application Data

(63) Continuation of application No. 09/015,592, filed on Jan. 29, 1998.

(51) Int. Cl.$^7$ .............. C08F 4/52; C08F 4/642; C08F 6/643
(52) U.S. Cl. .............. 502/107; 502/104; 502/117; 502/154; 502/155; 526/161; 526/943
(58) Field of Search .............. 502/107, 117, 502/154, 155; 526/161

(56) References Cited

U.S. PATENT DOCUMENTS

| | | | |
|---|---|---|---|
| 5,045,517 | 9/1991 | Campbell, Jr. et al. | 502/103 |
| 5,312,938 * | 5/1994 | Hefner et al. | 556/11 |
| 5,331,071 | 7/1994 | Kataoka et al. | 526/128 |
| 5,387,567 | 2/1995 | Tajima et al. | 502/103 |
| 5,451,555 | 9/1995 | Tajima et al. | 502/103 |
| 5,495,035 | 2/1996 | Jordan et al. | 556/1 |
| 5,597,935 * | 1/1997 | Jordan et al. | 556/11 |
| 5,808,122 | 9/1998 | Herrmann et al. | 556/58 |
| 5,861,352 * | 1/1999 | Gila et al. | 502/155 |
| 5,880,302 * | 3/1999 | Hermann et al. | 556/28 |
| 6,020,444 * | 2/2000 | Riedel et al. | 526/170 |

FOREIGN PATENT DOCUMENTS

2192770 * 6/1997 (CA) .

* cited by examiner

Primary Examiner—David W. Wu
Assistant Examiner—R. Rabago
(74) Attorney, Agent, or Firm—P. W. Leuzzi

(57) ABSTRACT

A catalyst composition is provided, which is prepared by contacting a cycloalkadienyl compound, a transition metal amide of the formula $M(NMe_2)_m X_n$, an aluminoxane, and optionally a solid support at a temperature of 0 to 100° C.

13 Claims, No Drawings

CATALYST COMPOSITION FOR THE POLYMERIZATION OF OLEFINS

This application is a continuation of U.S. application Ser. No. 09/015,592, filed on Jan. 29, 1998, the disclosure of which is incorporated by reference herein in its entirety.

The present invention relates to a catalyst composition useful for the polymerization of olefins, which is prepared by contacting a cycloalkadienyl compound, a transition metal amide of the formula $M(NMe_2)_m X_n$, an aluminoxane, and optionally a solid support at a temperature of 0 to 100° C.

BACKGROUND OF THE INVENTION

Transition metal metallocene compounds are useful as olefin polymerization catalysts in conjunction with cocatalysts such as aluminoxanes. These catalysts can advantageously produce olefin polymers with narrow molecular weight distributions, homogeneous comonomer distributions, and good processability.

However, the cost of such catalysts is higher than traditional Ziegler-Natta catalysts, due in part to the complex synthesis methods required to make them. Metallocene precursors are usually synthesized through transmetallation reactions, as illustrated in Scheme I (using the compound bis(indenyl)dimethylsilane as an example).

Scheme I

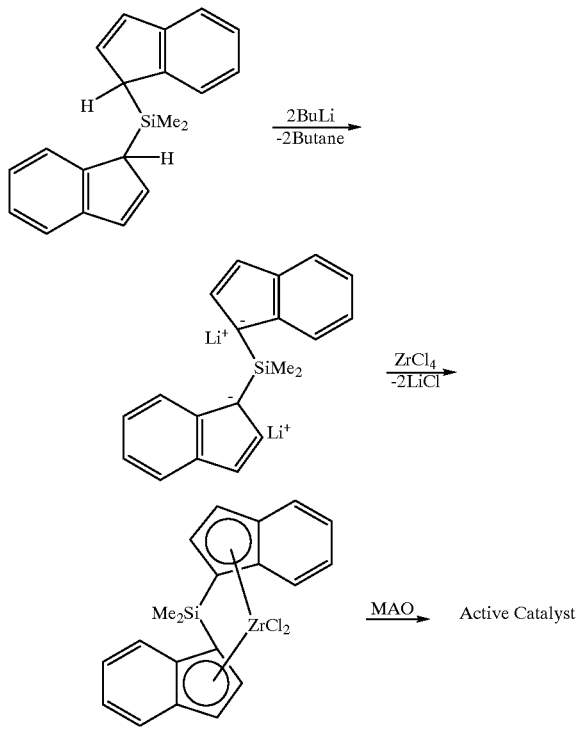

Since this process involves several organic/organometallic reaction steps, often at low temperatures, it becomes very costly on a large scale. Furthermore, the yields from this process can be fairly low. For example, it has been shown that in the process of converting dimethylsilyl bridged-bis(indenyl) type compounds to their corresponding zirconium complexes, the yield is typically between 10% to 60% (*Organometallics* 1994, 13, 964). This is highly undesirable since a large portion of expensive ligand is lost.

One way to reduce the overall cost of making this type of catalyst system is to avoid isolation of the metallocene precursor by simply combining the ingredients of the catalyst composition. For example, U.S. Pat. Nos. 5,378,567 and 5,451,555 relate to catalyst compositions for the homopolymerization or copolymerization of olefins. The catalyst compositions comprise a first compound of the formula $Me^1(OR^1)_p R^2_q X^1_{4-p-q}$, wherein $Me^1$ is Ti, Zr, or Hf, a second compound of the formula $Me^2(OR^3)_m R^4_n X^2_{z-m-n}$, wherein $Me^2$ is a Group I–III metal, and a third compound that is an organocyclic compound having two or more conjugated double bonds.

Similarly, U.S. Pat. No. 5,331,071 describes a process for the polymerization of olefinic hydrocarbons carried out in the presence of a catalyst component derived from reacting a compound of the formula $Me^1 R^1_n X^1_{4-n}$, wherein $Me^1$ is Ti, Zr, or Hf, a compound of the formula $Me^2 R^2_m X^2_{z-m}$, wherein $Me^2$ is a Group I–III metal, an organocyclic compound having two or more conjugated double bonds, and an inert carrier, along with a modified organoaluminum compound having Al—O—Al bonds.

Another way to reduce the overall cost of these catalyst compositions is to increase the yield of metallocene precursor through the use of Group 4 metal amides. For example, U.S. Pat. Nos. 5,495,035, and 5,597,935 describe the reaction of Group 4 metal amides with rac-bis-cyclopentadiene compounds to form metallocene amide precursors. However, these precursors must be isolated, chlorinated, and then activated separately with cocatalyst to form an active catalyst composition. Moreover, synthesis of the precursor by this process typically requires high temperatures (100° C. or above) and long reaction times. As a result, this method has been applied primarily to make compounds with ligands that are less sterically hindered. A constant nitrogen purge or dynamic vacuum to remove the co-product amine also has to be applied to drive the reaction to completion. These further add to the overall catalyst manufacturing cost.

SUMMARY OF THE INVENTION

Applicants have discovered a one-step process for directly preparing an activated metallocene catalyst composition using transition metal amide compounds, which requires mild reaction conditions and shorter reaction times compared to known processes. The process comprises contacting a cycloalkadienyl compound, a transition metal amide of the formula $(MNMe_2)_m X_n$, an aluminoxane, and optionally a solid support at a temperature of 0 to 100° C. Neither isolation nor chlorination of the metallocene precursor is required. Advantageously, interaction between the transition metal amide and the aluminoxane generates highly unsaturated and reactive intermediates that combine with the ligand to form the active catalyst composition. As a result, this process works extremely well even with more sterically hindered ligands.

The invention provides a process for producing a catalyst composition, which comprises contacting:

a) a cycloalkadienyl compound;

b) a metal compound having the formula:

$$M(NMe_2)_m X_n$$

wherein M is a Group 3, 4, or 5 metal;
Me is a methyl group;
each X is a halide, a hydrocarbyl group containing 1 to 20 carbons, an alkoxy group containing 1 to 20 carbons, or an amide group containing 1 to 20 carbons; and
the sum of m and n equals the valence of M, but m≠0;

c) an aluminoxane; and d) optionally, a solid support;

at a temperature in the range of 0 to 100° C.

The invention also provides a catalyst composition produced by the above process, along with a process for the polymerization of olefins using this catalyst composition.

DETAILED DESCRIPTION OF THE INVENTION

The catalyst composition is prepared by contacting a cycloalkadienyl compound, a transition metal amide, an aluminoxane, and optionally a solid support at a temperature of 0 to 100° C. Preferably, contacting takes place at a temperature of less than 100° C., more preferably in the range of 20 to 85° C.

Contacting is typically performed under atmospheric pressure. The time of contacting ranges from 0.01 to 24 hours, preferably from 0.1 to 6 hours, more preferably from 0.5 to 3 hours.

The cycloalkadienyl compound, transition metal amide, aluminoxane, and optionally the solid support, may be admixed in any order. Preferably, the order of mixing is as follows: cycloalkadienyl compound, aluminoxane, transition metal amide, and (if used) the solid support. A diluent such as isobutane, butane, pentane, hexane, heptane, toluene, and the like, or mixtures thereof, may by used if desired to dissolve one of more of the ingredients of the catalyst composition.

The cycloalkadienyl compound is an organic compound capable of interacting with a transition metal through pi-bonding. The cycloalkadienyl compound preferably has one of the formulas:

$$C_5H_xR_{5-x}$$

or $$Y(C_5H_zR_{4-z})(C_5H_yR_{4-y}),$$

wherein each R is independently a hydride, a substituted or unsubstituted alkyl group containing 1 to 20 carbons, or a substituted or unsubstituted aryl group containing 1 to 20 carbons. Two adjacent R groups may be joined to form a ring, such that the cycloalkadienyl compound comprises for example an indenyl or fluorenyl structure. Y is a bridging group, preferably containing 1 to 5 carbons, 1 to 3 heteroatoms such as silicon, germanium, boron, phosphorous, and nitrogen, or mixtures thereof. The letter x is 1 to 5; y is 1 to 4; and z is 1 to 4.

Examples of cycloalkadienyl compounds include but are not limited to dicyclopentadiene, methyldicyclopentadiene, 1,2-dimethylcyclpentadiene, 1,3-dimetylcyclopentadiene, iso-propylcyclopentadiene, methylpropylcyclopentadiene, n-butylcyclopentadiene, methyl-n-butylcyclopentadiene, bis(dicyclopentadienyl)dimethylsilane, bis(methylcyclopentadienyl)dimethylsilane, bis(1,3-dimethylcyclopentadienyl)dimethylsilane, indene, 1-methylindene, 2-methylindene, 1,3-dimethylindene, 1-propylindene, 2-propylindene, 1-phenylindene, 2-phenylindene, fluorene, 1,2-bis(indenyl)ethane, 1,2-bis(3-methylindenyl)ethane, 1-indenyl-2-(3-methylindenyl) ethane, 1,2-bis(2-methylindenyl)ethane, 1-indenyl-2-(2-methylindenyl)ethane, 1,2-bis(2-phenylindenyl)ethane, 1-indenyl-2-(2-phenylindenyl)ethane, bis(indenyl) dimethylsilane, bis(3-methylindenyl)dimethylsilane, indenyl(3-methylindenyl)dimethylsilane, bis(2-methylindenyl)-dimethylsilane, indenyl(2-methylindenyl) dimethylsilane, and bis(2-phenylindenyl)dimethylsilane.

Preferably, the cycloalkadienyl compound is selected from the group consisting of 1,2-bis(indenyl)ethane, 1,2-bis (2-methylindenyl)ethane, bis(indenyl)dimethylsilane, and bis(2-methylindenyl)dimethylsilane. Most preferably, the cycloalkadienyl compound is bis(2-methylindenyl)-dimethylsilane.

The transition metal amide has the formula:

$$M(NMe_2)_mX_n$$

wherein M is a Group 3, 4, or 5 metal, preferably a group 4 metal, more preferably zirconium or hafnium. Me is a methyl group. Each X is a halide, a hydrocarbyl group containing 1 to 20 carbons, an alkoxy group containing 1 to 20 carbons, or an amide group containing 1 to 20 carbons. Preferably, X is selected from the group consisting of chloride, bromide, methoxide, ethoxide, isopropoxide, dimethylamide, and diethylamide, diisopropylamide. The sum of m and n equals the valence of M, but m≠0.

It has been discovered that use of such transition metal amides, i.e., those containing at least one dimethyl amide group, is particularly advantageous for producing olefin polymerization catalyst compositions. Catalyst compositions made with transition metal amides containing at least one dimethyl amide group have higher activities than catalyst compositions made from even closely related transition metal amides containing only diethyl amide groups.

Examples of transition metal amides include but are not limited to $Zr(NMe_2)_4$, $Zr(NMe_2)_3(Cl)$, $Zr(NMe_2)_2(Cl_2)$, $Zr(NMe_2)(Cl_3)$, $Zr(NMe_2)_3(Br)$, $Zr(NMe_2)_2(Br_2)$, $Zr(NMe_2)(Br_3)$; $Zr(NMe_2)_3(OMe)$, $Zr(NMe_2)_3(OEt)$, $Zr(NMe_2)_3(OPr)$, $Zr(NMe_2)_3(O^iPr)$, $Zr(NMe_2)_3(O^nBu)$, $Zr(NMe_2)_3(O^tBu)$; $Zr(NMe_2)_2(OMe)_2$, $Zr(NMe_2)_2(OEt)_2$, $Zr(NMe_2)_2(OPr)_2$, $Zr(NMe_2)_2(O^iPr)_2$, $Zr(NMe_2)_2(O^nBu)_2$, $Zr(NMe_2)_2(O^tBu)_2$; $Zr(NMe_2)(OMe)_3$, $Zr(NMe_2)(OEt)_3$, $Zr(NMe_2)(OPr)_3$, $Zr(NMe_2)(O^iPr)_3$, $Zr(NMe_2)(O^nBu)_3$, $Zr(NMe_2)(O^tBu)_3$; $Zr(NMe_2)_3(NEt_2)$, $Zr(NMe_2)_2(NEt_2)_2$, $Zr(NMe_2)(NEt_2)_3$, $Zr(NMe_2)_3(N^nPr_2)$, $Zr(NMe_2)_2(N^nPr_2)_2$, $Zr(NMe_2)(N^nPr_2)_3$, $Zr(NMe_2)_3(N^iPr_2)$, $Zr(NMe_2)_2(N^iPr_2)_2$, $Zr(NMe_2)(N^iPr_2)_3$; $Hf(NMe_2)_4$, $Hf(NMe_2)_3(Cl)$, $Hf(NMe_2)_2(Cl_2)$, $Hf(NMe_2)(Cl_3)$, $Hf(NMe_2)_3(Br)$, $Hf(NMe_2)_2(Br_2)$, $Hf(NMe_2)(Br_3)$; $Hf(NMe_2)_3(OMe)$, $Hf(NMe_2)_3(OEt)$, $Hf(NMe_2)_3(OPr)$, $Hf(NMe_2)_3(O^iPr)$, $Hf(NMe_2)_3(O^nBu)$, $Hf(NMe_2)_3(O^tBu)$; $Hf(NMe_2)_2(OMe)_2$, $Hf(NMe_2)_2(OEt)_2$, $Hf(NMe_2)_2(OPr)_2$, $Hf(NMe_2)_2(O^iPr)_2$, $Hf(NMe_2)_2(O^nBu)_2$, $Hf(NMe_2)_2(O^tBu)_2$; $Hf(NMe_2)(OMe)_3$, $Hf(NMe_2)(OEt)_3$, $Hf(NMe_2)(OPr)_3$, $Hf(NMe_2)(O^iPr)_3$, $Hf(NMe_2)(O^nBu)_3$, $Hf(NMe_2)(O^tBu)_3$; $Hf(NMe_2)_3(NEt_2)$, $Hf(NMe_2)_2(NEt_2)_2$, $Hf(NMe_2)(NEt_2)_3$, $Hf(NMe_2)_3(N^nPr_2)$, $Hf(NMe_2)_2(N^nPr_2)_2$, $Hf(NMe_2)(N^nPr_2)_3$, $Hf(NMe_2)_3(N^iPr_2)$, $Hf(NMe_2)_2(N^iPr_2)_2$, $Hf(NMe_2)(N^iPr_2)_3$; $Ti(NMe_2)_4$, $Ti(NMe_2)_3(Cl)$, $Ti(NMe_2)_2(Cl_2)$, $Ti(NMe_2)(Cl_3)$, $Ti(NMe_2)_3(Br)$, $Ti(NMe_2)_2(Br_2)$, $Ti(NMe_2)(Br_3)$; $Ti(NMe_2)_3(OMe)$, $Ti(NMe_2)_3(OEt)$, $Ti(NMe_2)_3(OPr)$, $Ti(NMe_2)_3(O^iPr)$, $Ti(NMe_2)_3(O^nBu)$, $Ti(NMe_2)_3(O^tBu)$; $Ti(NMe_2)_2(OMe)_2$, $Ti(NMe_2)_2(OEt)_2$, $Ti(NMe_2)_2(OPr)_2$, $Ti(NMe_2)_2(O^iPr)_2$, $Ti(NMe_2)_2(O^nBu)_2$, $Ti(NMe_2)_2(O^tBu)_2$; $Ti(NMe_2)(OMe)_3$, $Ti(NMe_2)(OEt)_3$, $Ti(NMe_2)(OPr)_3$, $Ti(NMe_2)(O^iPr)_3$, $Ti(NMe_2)(O^nBu)_3$, $Ti(NMe_2)(O^tBu)_3$; $Ti(NMe_2)_3(NEt_2)$, $Ti(NMe_2)_2(NEt_2)_2$, $Ti(NMe_2)(NEt_2)_3$, $Ti(NMe_2)_3(N^nPr_2)$, $Ti(NMe_2)_2(N^nPr_2)_2$, $Ti(NMe_2)(N^nPr_2)_3$, $Ti(NMe_2)_3(N^iPr_2)$, $Ti(NMe_2)_2(N^iPr2)_2$, and $Ti(NMe_2)(N^iPr_2)_3$.

Preferably, the transition metal amide has the formula:

$$M'(NMe_2)_4$$

wherein M' is zirconium or hafnium. Most preferred is the compound $Zr(NMe_2)_4$.

Aluminoxanes are well known in the art, and may have one of the following formulas:

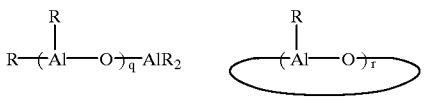

wherein each R is an alkyl group containing 1 to 12 carbons, q is 1 to about 40 and r is 3 to about 40. A variety of aluminoxanes are commercially available, such as methylaluminoxane (MAO), modified methylaluminoxane (MMAO), isobutylaluminoxane (IBAO), etc. Preferably, the aluminoxane is selected from the group consisting of methylaluminoxane, modified methylaluminoxane, and mixtures thereof.

The catalyst composition may be used in unsupported, liquid form (i.e., with no support), such as a solution, dispersion, or neat liquid as described in U.S. Pat. No. 5,317,036, or formed in-situ during polymerization. One or more solvents may be added to the catalyst composition to facilitate handling.

The catalyst composition may optionally comprise a solid, inert support. Suitable supports include silica, carbon black, polyethylene, polycarbonate porous crosslinked polystyrene, porous crosslinked polypropylene, alumina, thoria, zirconia, and magnesium halide (e.g., magnesium dichloride).

The catalyst composition may alternatively be spray dried as described in U.S. Pat. No. 5,648,310, or in the form of a prepolymer.

The ratios of the ingredients during contacting are typically as follows. The molar ratio of cycloalkadienyl compound to transition metal amide may vary from about 0.01 to about 20, preferably from about 0.1 to about 10.

The molar ratio of aluminoxane to transition metal amide may vary from about 10 to about 10,000, preferably from about 20 to about 1000.

The catalyst composition may be used for the polymerization of olefins by any suspension, solution, slurry, or gas phase process, using known equipment and reaction conditions, and is not limited to any specific type of reaction system. Generally, olefin polymerization temperatures range from about 0° C. to about 200° C. at atmospheric, subatmospheric, or superatmospheric pressures. Slurry or solution polymerization processes may utilize subatmospheric or superatmospheric pressures and temperatures in the range of about 40° C. to about 110° C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

Preferably, gas phase polymerization is employed, with superatmospheric pressures in the range of 1 to 1000 psi, preferably 50 to 400 psi, most preferably 100 to 300 psi, and temperatures in the range of 30 to 130° C., preferably 65 to 110° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions and in the presence of catalyst composition at a velocity sufficient to maintain a bed of solid particles in a suspended condition. A stream containing unreacted monomer is withdrawn from the reactor continuously, compressed, cooled, optionally fully or partially condensed as disclosed in U.S. Pat. Nos. 4,528,790 and 5,462,999, and recycled to the reactor. Product is withdrawn from the reactor and make-up monomer is added to the recycle stream. As desired for temperature control of the system, any gas inert to the catalyst composition and reactants may also be present in the gas stream. In addition, a fluidization aid such as carbon black, silica, clay, or talc may be used, as disclosed in U.S. Pat. No. 4,994,534.

Polymerization may be carried out in a single reactor or in two or more reactors in series, and is conducted substantially in the absence of catalyst poisons. Organometallic compounds may be employed as scavenging agents for poisons to increase the catalyst activity. Examples of scavenging agents are metal alkyls, preferably aluminum alkyls, most preferably triisobutylaluminum, and aluminoxanes.

Conventional adjuvants may be included in the process, provided they do not interfere with the operation of the catalyst composition in forming the desired polyolefin. Hydrogen or a metal or non-metal hydride, e.g., a silyl hydride, may be used as a chain transfer agent in the process. Hydrogen may be used in amounts up to about 10 moles of hydrogen per mole of total monomer feed.

Olefin polymers that may be produced according to the invention include, but are not limited to, ethylene homopolymers, homopolymers of linear or branched higher alpha-olefins containing 3 to about 20 carbon atoms, and interpolymers of ethylene and such higher alpha-olefins, with densities ranging from about 0.86 to about 0.96. Suitable higher alpha-olefins include, for example, propylene, 1-butene, 1-pentene, 1-hexene, 4-methyl-1-pentene, 1-octene, and 3,5,5-trimethyl-1-hexene. Olefin polymers according to the invention may also be based on or contain conjugated or non-conjugated dienes, such as linear, branched, or cyclic hydrocarbon dienes having from about 4 to about 20, preferably 4 to 12, carbon atoms. Preferred dienes include 1,4-pentadiene, 1,5-hexadiene, 5-vinyl-2-norbornene, 1,7-octadiene, vinyl cyclohexene, dicyclopentadiene, butadiene, isobutylene, isoprene, ethylidene norbornene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the invention as well. Specific olefin polymers that may be made according to the invention include, for example, polyethylene, polypropylene, ethylene/propylene rubbers (EPR's), ethylene/propylene/diene terpolymers (EPDM's), polybutadiene, polyisoprene and the like.

The following non-limiting examples further illustrate the invention.

EXAMPLES

Nomenclature

MAO (or PMAO): Solution of methylalumoxane in toluene (approximately 1.8 M in Al), commercially available from Akzo Nobel.

MMAO4: Solution of modified methylalumoxane in toluene (approximately 2.0 M in Al), commercially available from Akzo Nobel.

MMAO3A: Solution of modified methylalumoxane in heptane (approximately 2.3 M in Al), commercially available from Akzo Nobel.

EBI: 1,2-Bis(indenyl)ethane

EBI-2: 1,2-Bis(2-methylindenyl)ethane

SBI: Bis(indenyl)dimethylsilane

SBI-2: Bis(2-methylindenyl)dimethylsilane

TIBA: Tri(isobutyl)aluminum

MI is melt index, reported as grams per 10 minutes, determined in accordance with ASTM D-1238, condition E, at 190° C.

FI is flow index, reported as grams per 10 minutes, determined in accordance with ASTM D-1238, condition F, at 190° C., and is measured at ten times the weight used in the melt index text.

MFR is melt flow ratio, which is the ratio of flow index to melt index. It is related to the molecular weight distribution of the polymer.

DSC is differential scanning calorimetry. It measures the crystallization properties of the polymer. Data reported in the following examples are determined during the second heat cycle.

APS is average particle size in inches as measured by screening granular resin through a series of different mesh-size screens.

Bulk Density is pounds per cubic foot as measured by dividing the weight of a polymer resin by the bulk volume it occupies.

Synthesis of $Hf(NMe_2)_4$

This compound was synthesized according to *Organometallics*, 1996, 16, 4030–4037. Starting with 14.5 g of $HfCl_4$ and 11 g of $LiNMe_2$, 3.0 g of pure $Hf(NMe_2)_4$ was obtained.

Example 1

1a. Formation of catalyst $Zr(NMe_2)_4$/EBI/MMAO4

10.6 mg (39.7 μmole) of $Zr(NMe_2)_4$ and 10.3 mg (40.0 μmole) of EBI were weighed into a small vial in a dry box, followed by 12.0 mL of MMAO4. The vial was sealed with a Teflon coated septum, taken out of the dry box and heated to 75° C. for 1.0 hr. A purple solution with no visible solid particles was obtained.

1b. Polymerization

A 1-L, slurry phase, steel autoclave reactor was charged with 500 mL of dry hexane, TIBA scavenger and co-monomer (1-hexene). It was then heated to about 5 to 15° C. below the desired polymerization temperature and saturated with ethylene to the desired pressure. A solution of the catalyst prepared in section 1a (containing 1.0 μmole of zirconium) was then injected into the reactor with stirring using a high pressure syringe. The polymerization was quenched with an injection of methanol. The resin was air dried under ambient conditions without addition of any stabilizers.

The polymerization conditions and results are shown in Table 1.

Examples 2–12

A series of further catalyst compositions according to the invention, were made and used to polymerize ethylene and 1-hexene in the same manner as Example 1. The results are shown in Table 1.

TABLE 1

| Ex. | Catalyst Composition | Ligand/ Zr Mole Ratio | Al/Zr Mole Ratio | Activity (g/mmole hr 100 psi) | FI | MFR |
|---|---|---|---|---|---|---|
| 1 | Zr(NMe2)4/EBI/MMAO4 | 1.00 | 540 | 160,770 | 32.66 | 83.7 |
| 2 | Zr(NMe2)4/EBI/MMAO4 | 1.00 | 540 | 225,850 | 39.13 | 67.5 |
| 3 | Zr(NMe2)4/EBI2/MMAO4 | 1.00 | 540 | 97,184 | 5.75 | |
| 4 | Zr(NMe2)4/EBI2/MMAO4 | 1.00 | 540 | 138,376 | 4.85 | |
| 5 | Zr(NMe2)4/EBI2/MMAO4 | 1.00 | 540 | 139,100 | 4.66 | |
| 6 | Zr(NMe2)4/SBI/MMAO4 | 1.00 | 540 | 86,790 | 759.60 | 63.4 |
| 7 | Zr(NMe2)4/SBI/MMAO4 | 1.00 | 540 | 85,870 | 844.90 | 38.3 |
| 8 | Zr(NMe2)4/SBI/MMAO4 | 1.00 | 540 | 100,850 | | |
| 9 | Zr(NMe2)4/SBI2/MMAO4 | 1.00 | 540 | 127,350 | 1.19 | |
| 10 | Zr(NMe2)4/SBI2/MMAO4 | 1.00 | 540 | 174,400 | 0.99 | |
| 11 | Zr(NMe2)4/EBI2/MMAO3A | 1.00 | 540 | 102,723 | 6.57 | |
| 12 | Zr(NMe2)4/EBI2/MMAO3A | 1.00 | 540 | 108,920 | 6.35 | |

Synthesis of $Zr(NMe_2)_4$

This compound was synthesized according to *Organometallics*, 1995, 15, 5–7.

$ZrCl_4$ (12.0 g, 51.5 mmole) was slowly added to a slurry of $LiNMe_2$ (12.0 g, 235 mmole) in 150 mL of dry toluene. After stirring for 12 hr at room temperature, the solvent was removed under vacuum. The solid residue was sublimed at 85° C. under vacuum to give 7.0 g of crystalline product $Zr(NMe_2)_4$.

Examples 13–20 (Comparative)

A series of comparative catalyst compositions (Examples 13–20) were made in the same manner as Example 1, except using zirconium tetrakis(diethyl)amide. The results are shown in Table 2. The polymerization activities in Comparative Examples 13–20 were much lower than those of Examples 1–12.

TABLE 2

(Comparative)

| Example | Catalyst Composition | Ligand/Zr Mole Ratio | Mole Ratio | 1-Hexene (mL) | Activity (g/mmole Zr hr 100 psi) | FI | MFR |
|---|---|---|---|---|---|---|---|
| 13 | Zr(NEt2)4/EBI/MMAO4 | 0.5 | 310 | 20 | 60,370 | 99.39 | 25.2 |
| 14 | Zr(NEt2)4/EBI/MMAO4 | 1.0 | 310 | 20 | 67,820 | | |
| 15 | Zr(NEt2)4/EBI-2/MMAO4 + MMAO3A | 1.0 | 660 | 20 | 65,800 | 10.27 | |
| 16 | Zr(NEt2)4/EBI-2/MMAO4 + MMAO3A | 1.0 | 660 | 20 | 75,100 | 9.08 | 75.7 |
| 17 | Zr(NEt2)4/SBI/MMAO4 | 1.0 | 150 | 20 | 10,530 | 844.90 | 40.6 |
| 18 | Zr(NEt2)4/SBI/MMAO4 | 1.0 | 500 | 20 | 39,470 | | |
| 19 | Zr(NEt2)4/SBI-2/MMAO4 | | | | | | |
| 20 | Zr(NEt2)4/SBI-2/MMAO4 + MMAO3A | 1.0 | 660 | 20 | 67,400 | | |

Examples 21–25

A series of catalyst compositions according to the invention were made the same way as Example 1, except using tetrakis(dimethyl)amide hafnium. The results are shown in Table 3.

Examples 26–30 (Comparative)

A series of comparative catalyst compositions were made in the same manner as Example 1, except using tetrakis(diethyl)amide hafnium. The results are shown in Table 4.

Comparative Examples 26–30 showed much lower activities than did Examples 21–25.

Examples 31–32 (Comparative)

In Examples 31–32 rac-ethylenebis(indenyl)hafniumdichloride (rac-EBI-HfCl$_2$) (purchased from Boulder Scientific Co., Mead, Colo.) was mixed with a MMAO4 in a small vial in a dry box. The resulting catalyst composition was used to polymerize ethylene and 1-hexene in the same manner as Example 1. The activities of the catalyst compositions of the invention in Table 3 compare well with those of the catalyst compositions of Examples 31 and 32.

TABLE 3

| Example | Catalyst Composition | Ligand/Zr Mole Ratio | Al/Hf | Aging time/temp. | 1-Hexene (mL) | Activity (g/mmole hr 100 psi) | FI | DSC (C) |
|---|---|---|---|---|---|---|---|---|
| 21 | Hf(NMe2)4/EBI/MMAO4 | 1.00 | 540 | 1 hr/80 C. | 20 | 18,400 | | |
| 22 | Hf(NMe2)4/EBI/MMAO4 | 1.00 | 540 | 2 hr/80 C. | 20 | 27,280 | 1.54 | 68.53, 110.76 |
| 23 | Hf(NMe2)4/EBI/MMAO4 | 1.00 | 540 | 3 hr/80 C. | 20 | 25,425 | 1.04 | |
| 24 | Hf(NMe2)4/EBI/PMAO | 1.00 | 490 | 1 hr/80 C. | 20 | 9,750 | | |
| 25 | Hf(NMe2)4/EBI/PMAO | 1.00 | 490 | 2 hr/80 C. | 20 | 13,030 | 13.63 | |

TABLE 4

(Comparative)

| Example | Catalyst Composition | Ligand/Zr Mole Ratio | Al/Hf Mole Ratio | Aging time/temp. | 1-Hexene (mL) | Activity (g/mmole hr 100 psi) | FI | DSC (C) |
|---|---|---|---|---|---|---|---|---|
| 26 | Hf(NEt$_2$)$_4$/EBI/MMAO4 | 1.00 | 540 | 0.50 hr/75 C. | 20 | 5,480 | 5.56 | |
| 27 | Hf(NEt$_2$)$_4$/EBI/MMAO4 | 1.00 | 540 | 1 hr/110 C. | 20 | 8,926 | | |
| 28 | Hf(NEt$_2$)$_4$/EBI/MMAO4 | 1.00 | 540 | 4 hr 110 C. | 20 | 5,379 | | |
| 29 | Hf(NEt$_2$)$_4$/EBI/PMAO | 1.00 | 540 | 0.5 hr/75 C. | 20 | 4,000 | | |
| 30 | Hf(NEt$_2$)$_4$/EBI/PMAO | 1.00 | 540 | 2 hr/110 C. | 20 | 3,400 | | |
| 31 | rac-EBI/HfCl$_2$/MMAO4 | | 540 | 0.5 hr/20 C. | 20 | 32,400 | 1.34 | 70.0, 107.63 |
| 32 | rac-EBI/HfCl$_2$/MMAO4 | | 540 | 3 hr/20 C. | 20 | 31,200 | 0.88 | 70.49, 108.33 |

Example 33

A catalyst composition was made from SBI-2, $Zr(NMe_2)_4$, and MMAO4 in the manner of Example 1. It was used for the co-polymerization of ethylene and 1-hexene in the gas phase as follows.

A stirred-bed fluidized gas-phase reactor was used. A detailed description of the reactor and its operation can be found in U.S. Pat. No. 5,317,036 assigned to Union Carbide Corp. Before polymerization, a pre-bed (polyethylene) was loaded into the reactor. It was dried, flushed with nitrogen, and passivated with an aluminum alkyl solution to remove any residue oxygen and moisture. During the polymerization process, a solution of the catalyst composition, along with additional co-catalyst (MMAO3A) was fed to the reactor. The polymerization process was monitored continuously. The ethylene partial pressure and 1-hexene/ethylene ratio were maintained at 240 psi and 0.007, respectively. A small amount of hydrogen was used to control the molecular weight.

At the end of the run, a 14.67 lbs of granular ethylene copolymer was obtained. As shown in Table 5, the copolymer had a Melt Index (MI) and Melt Flow Ratio (MFR) of 0.03 and 83.0, respectively. A low zirconium residue of 1.8 ppm (average of two measurements) was obtained, indicating a high productivity catalyst composition.

Examples 34–37

Further catalyst compositions according to the invention were used to polymerize ethylene and 1-hexene in the manner of Example 33. The results are shown in Table 5.

wherein M is a Group 3, 4, or 5 metal;
Me is a methyl group;
each X is a halide, a hydrocarbyl group containing 1 to 20 carbons, an alkoxy group containing 1 to 20 carbons, or an amide group containing 1 to 20 carbons; and
the sum of m and n equals the valence of M, but m≠0;
c) an aluminoxane; and
d) optionally, a solid support;
at a temperature in the range of 0 to 100° C.

2. The process of claim 1, wherein the cycloalkadienyl compound has the formula:

$$C_5H_xR_{5-x}$$

or $$Y(C_5H_zR_{4-z})(C_5H_yR_{4-y}),$$

wherein each R is independently a hydride, a substituted or unsubstituted alkyl group having 1 to 20 carbons, or a substituted or unsubstituted aryl group having 1 to 20 carbons, and two adjacent R groups may be joined to form a ring; Y is a bridging group; x is 1 to 5; y is 1 to 4; and z is 1 to 4.

3. The process of claim 2, wherein the cycloalkadienyl compound is selected from the group consisting of 1,2-bis(indenyl)ethane, 1,2-bis(2-methylindenyl)ethane, bis(indenyl)dimethylsilane, and bis(2-methylindenyl)dimethylsilane.

4. The process of claim 1, wherein the metal compound is $Zr(NMe_2)_4$.

TABLE 5

|  | Example | | | | |
|---|---|---|---|---|---|
|  | 33 | 34 | 35 | 36 | 37 |
| Catalyst Composition | SBI-2/ $Zr(NMe_2)_4$/MMAO | SBI-2/ $Zr(NMe_2)_4$/MMAO | SBI-2/ $Zr(NMe_2)_4$/MMAO | SBI-2/ $Zr(NMe_2)_4$/MMAO | SBI-2/ $Zr(NMe_2)_4$/MMAO |
| Ratio | 1/1/115 | 1/1/115 | 1/1/112 | 1/1/112 | 1/1/240 |
| [Zr], mol/l | 7.00E–03 | 7.00E–03 | 7.00E–03 | 7.00E–03 | 7.00E–03 |
| Additional Cocatalyst | MMAO3A | MMAO3A | MMAO3A | MMAO3A | MMAO3A |
| Temperature (C.) | 75 | 85 | 85 | 85 | 85 |
| H2/C2 | 0 | 0.03 | 0.007 | 0.006 | 0.0065 |
| C6/C2 | 0.007 | 0.009 | 0.01 | 0.009 | 0.007 |
| flow index | 2.49 | 1639.6 | 169.49 | 33.59 | 70.37 |
| melt index | 0.03 | 41.5 | 2.69 | 0.436 | 1.12 |
| MFR | 83.0 | 39.5 | 63.0 | 77.0 | 62.8 |
| density | 0.928 | 0.922 | 0.912 | 0.910 | 0.911 |
| batch weight, lbs | 14.67 | 29.5 | 33.5 | 45.45 | 30.99 |
| APS | 0.041 | 0.051 | 0.069 | 0.068 | 0.068 |
| bulk density | 24.2 | 31.6 | 23 | 19.6 | 24.3 |
| Metals |  |  |  |  |  |
| wt % Al | 0.17, 0.17 | 0.18, 0.17 | 0.22, 0.22 | 0.13, 0.12 |  |
| ppm Zr | 2.2, 1.4 | 2.2, 1.8 | 1.5, 1.4 | 2.2, 1.9 |  |

We claim:

1. A process for producing an activated metallocene catalyst composition, which comprises contacting in one step:
    a) a cycloalkadienyl compound;
    b) a transition metal amide having the formula:

$$M(NMe_2)_mX_n$$

5. The process of claim 1, wherein the aluminoxane is selected from the group consisting of methylaluminoxane, modified methylaluminoxane, and mixtures thereof.

6. The process of claim 1, wherein the temperature is in the range of 20 to 85° C.

7. The process of claim 1, wherein the molar ratio of cycloalkadienyl compound to transition metal amide is within the range of from about 0.01 to about 20.

8. The process of claim 7, wherein the molar ratio of cycloalkadienyl compound to transition metal amide is within the range of from about 0.1 to about 10.

9. The process of claim 1, wherein the molar ratio of aluminoxane to transition metal amide is within the range of from about 10 to about 10,000.

10. The process of claim 9, wherein the molar ratio of aluminoxane to transition metal amide is within the range of from about 20 to about 1,000.

11. The process of claim 1, wherein the contacting is carried out at atmospheric pressure.

12. The process of claim 1, wherein the contacting is carried out for a period of time within the range of from about 0.01 hours to about 24 hours.

13. The process of claim 12, wherein the contacting is carried out for a period of time within the range of from about 0.5 hours to about 3 hours.

* * * * *